(No Model.)
J. E. MURRAY.
HOOK.
No. 431,753. Patented July 8, 1890.
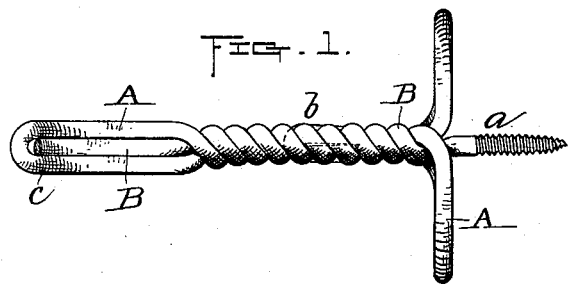
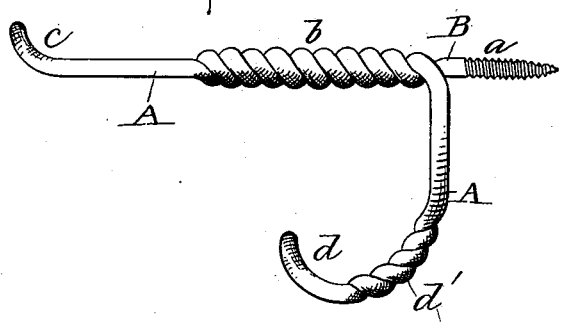
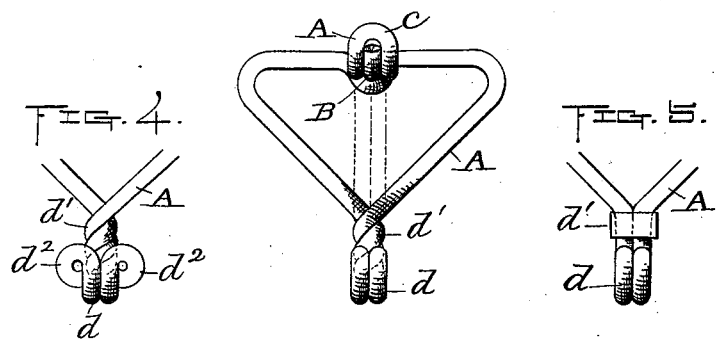
Witnesses:
Walter B. Nourse.
C. Forrest Herron.
Inventor:
John E. Murray.
By A. A. Barker Att'y.

UNITED STATES PATENT OFFICE.

JOHN E. MURRAY, OF WORCESTER, MASSACHUSETTS.

HOOK.

SPECIFICATION forming part of Letters Patent No. 431,753, dated July 8, 1890.

Application filed April 12, 1890. Serial No. 347,629. (No model.)

*To all whom it may concern:*

Be it known that I, JOHN E. MURRAY, of the city and county of Worcester, and State of Massachusetts, have invented certain new and useful Improvements in Coat and Hat Hooks; and I do hereby declare that the following is a full, clear, and exact description thereof, reference being had to the accompanying drawings, forming a part of this specification, and in which—

Figure 1 represents a top or plan view of a wire coat and hat hook embodying my improvements. Fig. 2 is a side view thereof. Fig. 3 is a front view, and Figs. 4 and 5 show modifications in the construction of the lower hook hereinafter described.

My invention relates to wire coat and hat hooks composed of two pieces of wire bent and intertwisted to form a double hook and provided with a screw end for fastening the same in position, as hereinafter more fully set forth.

To enable those skilled in the art to which my invention appertains to make and use the same, I will now proceed to describe it more in detail.

In the drawings, A represents one wire, the main wire, and B the other, composing my improved hook. Said hook consists of the screw end $a$, shank $b$, upper hook $c$, and lower hook $d$, and is made as follows: The main wire A is of sufficient length to extend doubled from end to end of the hook, while the shorter wire B forms the screw end $a$ and extends forward a sufficient distance for intertwisting the same with the shank portion of the main hook to hold said screw end in position. It is preferably made long enough to extend out to the end of the upper hook, as shown in Figs. 1 and 3 of the drawings.

In making the hook the main wire A is first bent at the middle and doubled upon itself, leaving sufficient space between the two halves of the wire to receive the screw-wire B, said double part being carried back to the point where the hook bears upon the wall or other support. The two halves are then bent at or about right angles to the shank and to form the lower hook $d$, the two ends of the wire forming the terminus of said lower hook, as is shown in Figs. 3, 4, and 5. Having been thus bent and the loop at the middle curved up to form the upper or main hook $c$, the short wire B, provided with the screw end $a$, is laid between the two halves of wire A at the shank portion $b$, with said screw end projecting out at the rear the usual distance. The two wires are now intertwisted at said shank the proper distance to securely hold the same together, thus producing a firm and rigid screw end for the hook. That portion of the main wire which extends down to form the lower hook may be intertwisted or not, as desired.

In practice I prefer to carry the two halves of the wire out laterally for a short distance, as is shown in Fig. 3, before extending the same down from the shank to form the bottom hook for the purpose of obtaining a bearing at each side of the screw against the wall or other support to hold the hook in position laterally. I do not limit myself thereto, however, as the wires may be carried down perpendicularly, as shown by dotted lines in said figure, without materially affecting the utility of the hook or departing from the principle of my invention.

The ends of wire A may be fastened at $d'$ by intertwisting the same, as shown in Figs. 2 and 3, or by means of a suitable collar or staple, as shown in Fig. 5, or in the construction of cheap hooks the ends may be left free without any fastening whatever. I reserve the right to make both the upper and lower hook of any desired shape.

In Figs, 2, 3, and 5 I have represented the terminal points of the two ends perfectly plain, simply rounding the same to prevent injury to clothing, while in Fig. 4 said ends are shown curved over laterally in the form of small loops $d^2$ $d^2$, thus producing a wider and better bearing for said clothing.

A hook constructed as hereinbefore described, it is obvious, is strong, durable, and effective, and may be manufactured cheaply.

I am aware that it is not broadly new to employ two pieces of wire in the construction of hooks of this class, and therefore limit my invention to the special way I have adopted of combining said parts and bending and intertwisting the same to produce my improved hook.

What I claim is—

1. In a wire coat and hat hook, the short horizontal piece of wire B, having the screw end $a$ and its body intertwisted with the main stem or shank of the hook, substantially as and for the purpose set forth.

2. A wire coat and hat hook consisting of the main wire A doubled at the center, bent at said center to form the upper hook $c$, twisted at the shank $b$, carried down from the base of said shank to form the lower hook $d$, with the terminal ends of the wire forming said hook, in combination with the short horizontal piece of wire B, having the screw end $a$ and the body thereof intertwisted with the shank of the main wire A, substantially as and for the purpose set forth.

JOHN E. MURRAY.

Witnesses:
A. A. BARKER,
W. B. NOURSE.